(12) United States Patent  
Gretz

(10) Patent No.: US 7,038,131 B1
(45) Date of Patent: May 2, 2006

(54) TELESCOPING BOX ADAPTER

(75) Inventor: Thomas J. Gretz, Clarks Summit, PA (US)

(73) Assignee: Arlington Industries, Inc., Scranton, VA (US)

( * ) Notice: Subject to any disclaimer, the term of this patent is extended or adjusted under 35 U.S.C. 154(b) by 0 days.

(21) Appl. No.: 11/121,531

(22) Filed: May 4, 2005

(51) Int. Cl.
 *H01H 9/02* (2006.01)

(52) U.S. Cl. .......................... 174/58; 174/50; 248/906; 220/4.02

(58) Field of Classification Search .................. 174/58, 174/50, 17 R, 57; 220/3.2, 3.3, 3.4, 4.02, 220/3.6, 3.7; 248/906; 439/535
See application file for complete search history.

(56) References Cited

U.S. PATENT DOCUMENTS

| 4,634,015 | A | | 1/1987 | Taylor |
| 5,012,043 | A | | 4/1991 | Seymour |
| 5,042,673 | A | | 8/1991 | McShane |
| 5,574,255 | A | | 11/1996 | Simmons |
| 5,596,174 | A | | 1/1997 | Sapienza |
| 5,931,325 | A | * | 8/1999 | Filipov ........................ 220/3.7 |
| 5,967,354 | A | * | 10/1999 | Whitehead et al. .......... 220/3.3 |
| 6,753,471 | B1 | * | 6/2004 | Johnson et al. ............... 174/50 |
| 6,858,802 | B1 | * | 2/2005 | Hagarty et al. ............... 174/58 |
| 6,908,003 | B1 | * | 6/2005 | Feyes et al. ................. 220/3.2 |
| 6,953,894 | B1 | * | 10/2005 | Ungerman et al. ........... 174/58 |

* cited by examiner

*Primary Examiner*—Dhiru R. Patel

(57) ABSTRACT

A telescoping box adapter that enables a user to adjust the enclosure on an electrical box from a compressed to an expanded configuration. The telescoping box adapter includes a first frame member that is secured to an electrical box. A second frame member having sidewalls slightly larger than the first frame member is slideable with respect to the first frame member. Additional frame members can be provided with successively larger sidewalls thus making each additional frame member slideable with respect to the next smaller frame member. A cover is secured to the outermost frame member and is movable from an open to a closed position. Sliding the outermost frame member fully forward adjusts the box adapter to a fully expanded configuration forming an expanded enclosure therein. Sliding the outermost frame member fully rearward adjusts the box adapter to a fully compressed configuration forming a compressed enclosure therein.

15 Claims, 11 Drawing Sheets

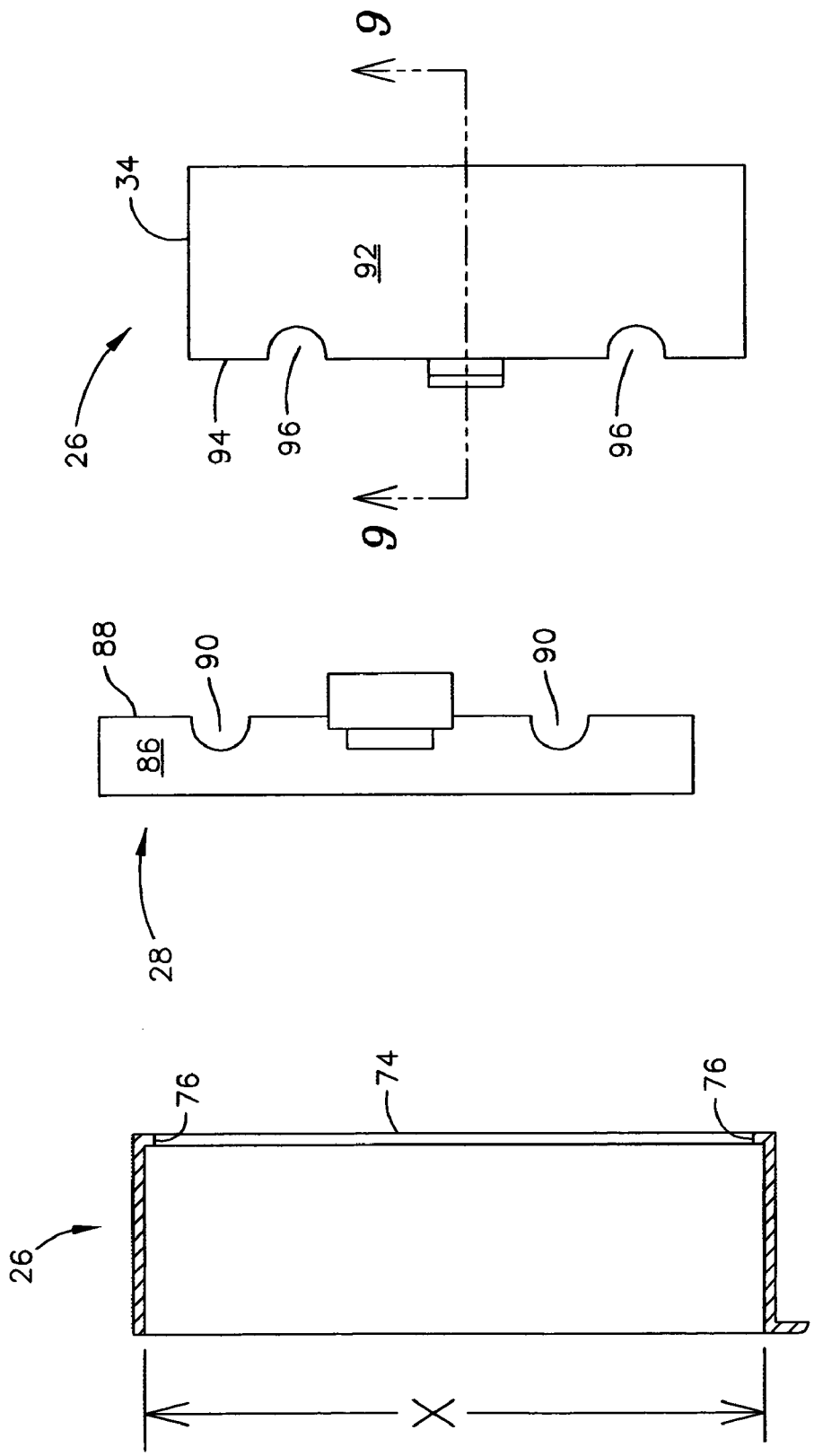

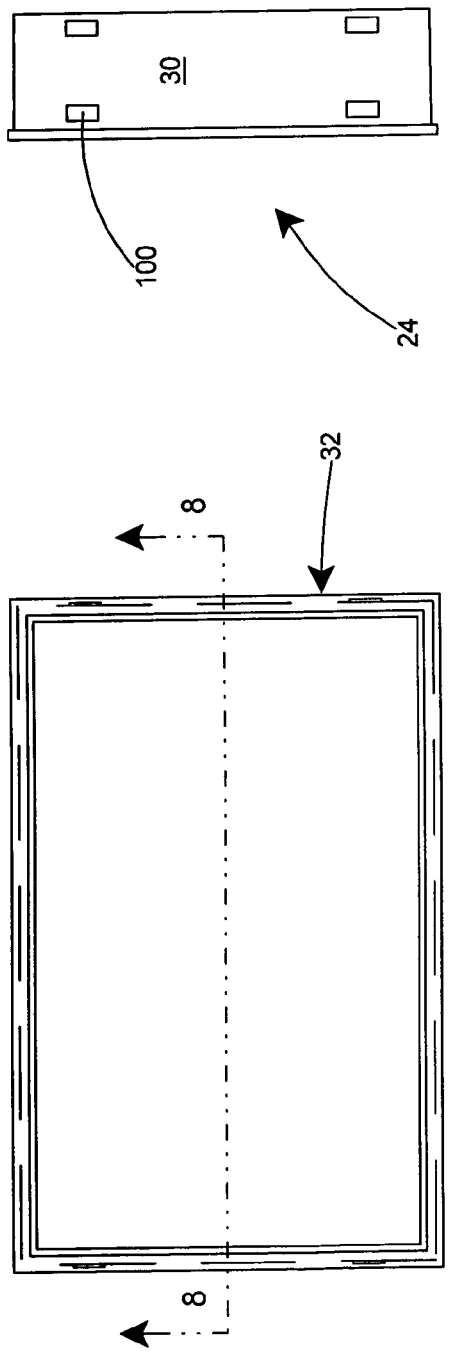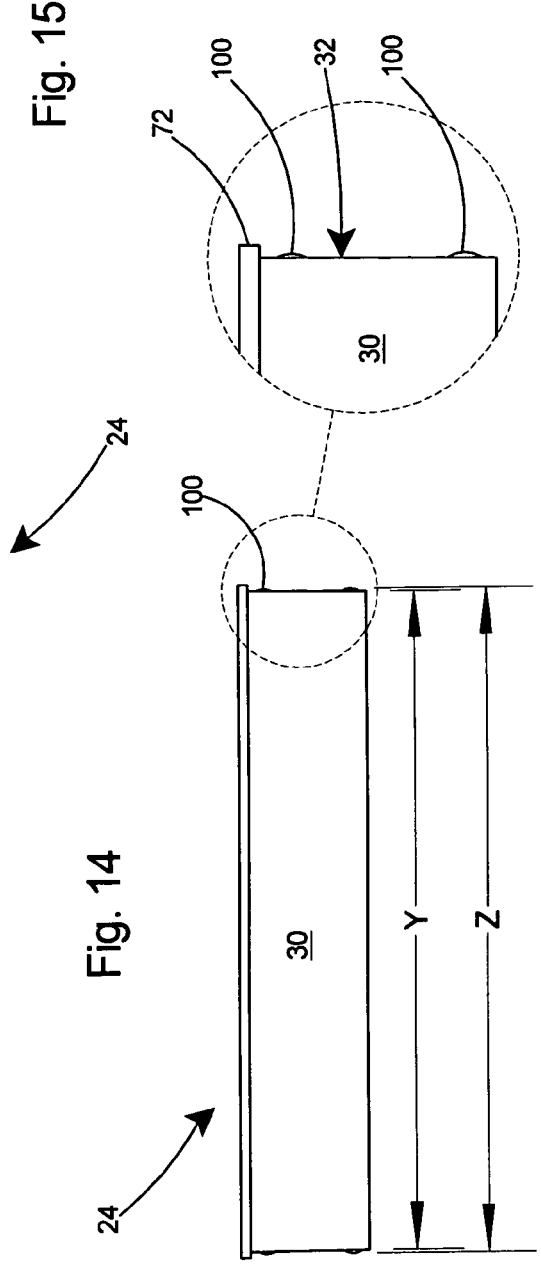

TELESCOPING BOX ADAPTER

FIELD OF THE INVENTION

This invention relates to covers for electrical outlets and specifically to a novel weatherproof adaptable cover that can be adjusted from an expanded configuration to accommodate an outlet having a plug inserted therein or to a collapsed configuration to accommodate the outlet without an inserted plug.

BACKGROUND OF THE INVENTION

Electrical outlets are commonly installed on the exteriors of buildings to provide electrical service for powering outdoor equipment, lights, and similar devices. For those electrical outlets installed on the exterior of a building, the National Electrical Code now requires that each outlet be weatherproof.

The "bubble" outlet covers now in use are of a fixed size and large enough to accommodate electrical cords that are plugged into the outlet. These are commonly called while-in-use covers as the cover protects the outlet and plugs while the outlet is used for providing electrical service to a location remote from the outlet.

Although the current while-in-use electrical box covers adequately cover the electrical outlet, they suffer from several disadvantages. For those situations in which there are no electrical cords plugged into the outlet, the openings for the electrical cords, which are open at all times, provide open passageways for allowing weather to enter the openings and thereby defeat the purpose of the weatherproof cover. Since the cover must be large enough to extend beyond the electrical plugs and the arc of the cords, the typical bubble cover protrudes 3 inches or more from the electrical box and the building's exterior wall. This protrusion from the wall places the cover in a position where it can be easily impacted by outdoor power equipment, vehicles and the like and also creates an unsightly electrical outlet that detracts from the building's attractiveness. Additionally, the bubble cover extends this unsightly distance from the wall regardless of whether or not an electrical cord is plugged into the outlet.

Accordingly, what is needed is an electrical box cover that is weatherproof when electrical cords are plugged into the outlet and also weatherproof when the outlet is free of plugs. Additionally, the extension of the cover from the wall must be kept to a minimum, for protection of the cover and outlet and also to enhance the attractiveness of the electrical box and cover.

SUMMARY OF THE INVENTION

The invention is a telescoping box adapter that enables a user to adjust the enclosure on an electrical box from a compressed to an expanded configuration. The telescoping box adapter includes a first frame member that is secured to an electrical box. A second frame member having sidewalls slightly larger than the first frame member is slideable with respect to the first frame member. Additional frame members can be provided with successively larger sidewalls thus making each additional frame member slideable with respect to the next smaller frame member. A cover is secured to the outermost frame member and is movable from an open to a closed position. Sliding the outermost frame member fully forward adjusts the box adapter to a fully expanded configuration forming an expanded enclosure therein. Sliding the outermost frame member fully rearward adjusts the box adapter to a fully compressed configuration forming a compressed enclosure therein.

OBJECTS AND ADVANTAGES

The telescoping box adapter of the present invention includes several advantages over the prior art bubble covers that are currently predominant in the electrical industry, including:
  a) In those situations in which an electrical cord is not installed in the outlet, all open cord passageways can be closed off by changing the telescoping box adapter to a compressed configuration.
  b) By simple adjustment, the telescoping box adapter provides a weatherproof enclosure for an outlet having one or more electrical cords plugged therein and also a weatherproof enclosure for an empty outlet having no cords plugged therein.
  c) The telescoping box adapter provides a weatherproof enclosure that extends a minimal amount from the wall when in the compressed configuration thereby protecting the enclosure and electrical device therein from impacts.
  d) By providing a low profile, the telescoping box adapter enhances the attractiveness of a building.
  e) The telescoping box adapter provides a truly weatherproof cover for electrical boxes, thereby enabling electrical box installations using the adapter to meet the National Electrical Code for weatherproof electrical boxes.

These and other objects and advantages of the present invention will be better understood by reading the following description along with reference to the drawings.

DESCRIPTION OF THE DRAWINGS

FIG. 9 is a sectional view of the second frame member taken along line 9—9 of FIG. 11.

FIG. 10 is a bottom view of a cover member portion of the telescoping box adapter of FIG. 1.

FIG. 11 is a bottom view of the outer frame member portion of the telescoping box adapter of FIG. 1.

FIG. 14 is a front view of a first frame member portion of the telescoping box adapter of the present invention.

FIG. 15 is an end view of the first frame member portion of FIG. 13.

FIG. 16 is a side view of the first frame member portion of FIG. 13.

FIG. 16A is a detailed view of an end portion of the first frame member of FIG. 15.

TABLE OF NOMENCLATURE

Figure 1:
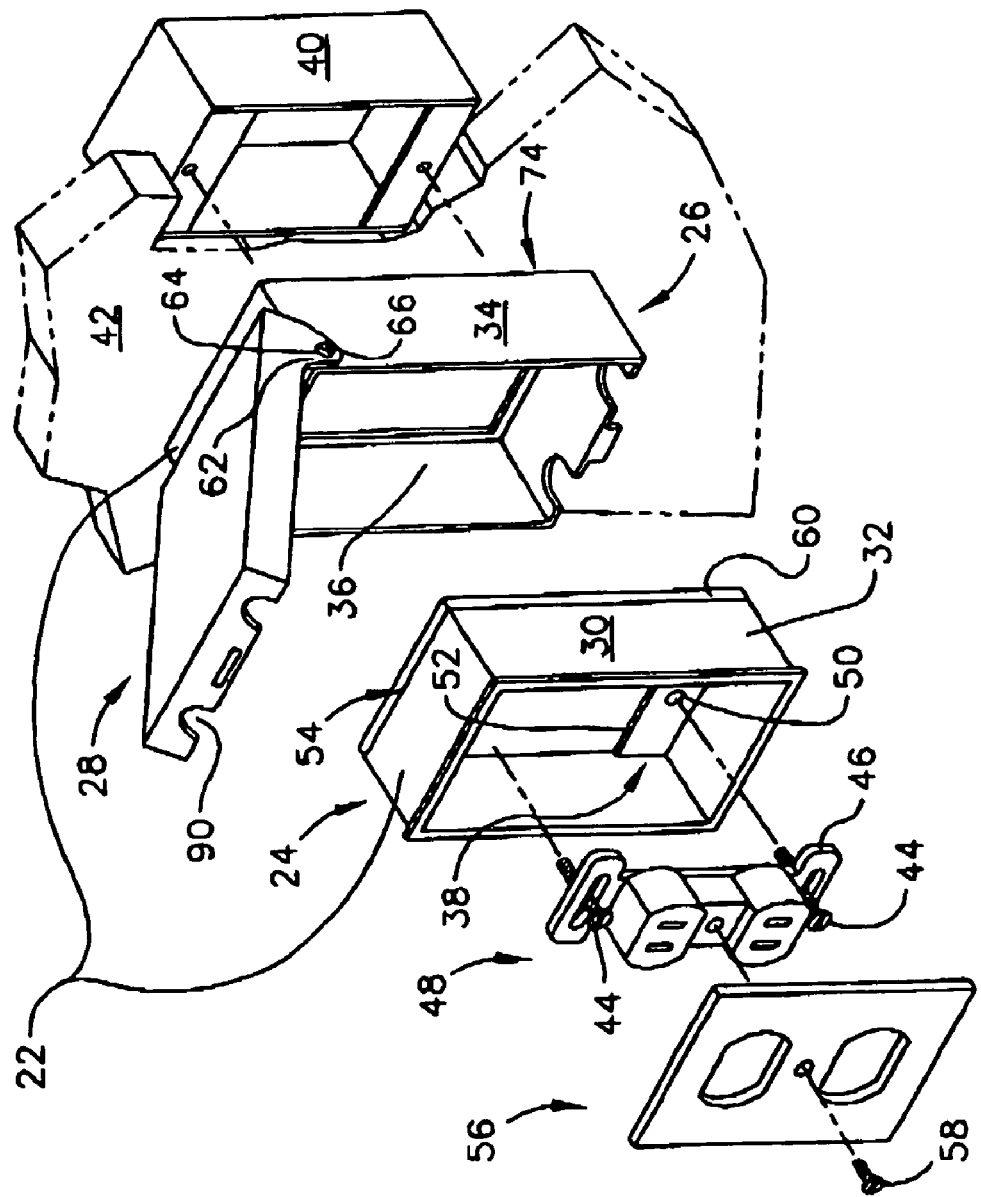
FIG. 1 is an exploded perspective view of a first embodiment of a two-tier telescoping box adapter according to the present invention in alignment with an electrical box and an electrical device to be installed in the box.

The following is a listing of part numbers used in the drawings along with a brief description:

| Part Number | Description |
| --- | --- |
| 22 | telescoping box adapter, first embodiment (2-tier) |
| 24 | first frame member |
| 26 | second frame member |
| 28 | cover member |
| 30 | sidewalls of first frame member |
| 32 | outer periphery of sidewalls of first frame member |
| 34 | sidewalls of second frame member |
| 36 | inner periphery of sidewalls of second frame member |
| 38 | fastening arrangement |
| 40 | electrical box |
| 42 | wall |
| 44 | fastener |
| 46 | ear on electrical device |
| 48 | electrical device or duplex outlet |
| 50 | aperture |
| 52 | extension |
| 54 | rear edge of first frame member |
| 56 | face plate |
| 58 | fastener |
| 60 | gasket |
| 62 | ears on cover member |
| 64 | aperture in ear |
| 66 | post |
| 70 | front edge of first frame member |
| 72 | outward extending lip on first frame member |
| 74 | rear edge of second frame member |
| 76 | inward extending lip on second frame member |
| 78 | fully expanded configuration |
| 80 | expanded enclosure |
| 82 | fully compressed configuration |
| 84 | compressed enclosure |
| 86 | lower sidewall of cover member |
| 88 | lower edge of cover lower sidewall |
| 90 | U-shaped opening in cover |
| 92 | lower sidewall of second frame member |
| 94 | front edge of second frame member |
| 96 | U-shaped opening in second frame member |
| 98 | circular cord opening |
| 100 | nub |
| 106 | latch member on cover |
| 108 | opening in latch member |
| 110 | engaging surface |
| 112 | bendable tab on second frame member |
| 114 | openings defining bendable tab |
| 116 | telescoping box adapter, second embodiment (3-tier) |

-continued

| Part Number | Description |
| --- | --- |
| 118 | middle frame member |
| 120 | electrical cord |
| C1 | first clearance between sidewalls |
| C2 | second clearance between nub and sidewall |
| X | inside dimension within sidewalls of second frame member |
| Y | outside dimension across sidewalls of first frame member |
| Z | outside dimension across nubs of the first frame member |

DETAILED DESCRIPTION OF THE INVENTION

Figure 12:
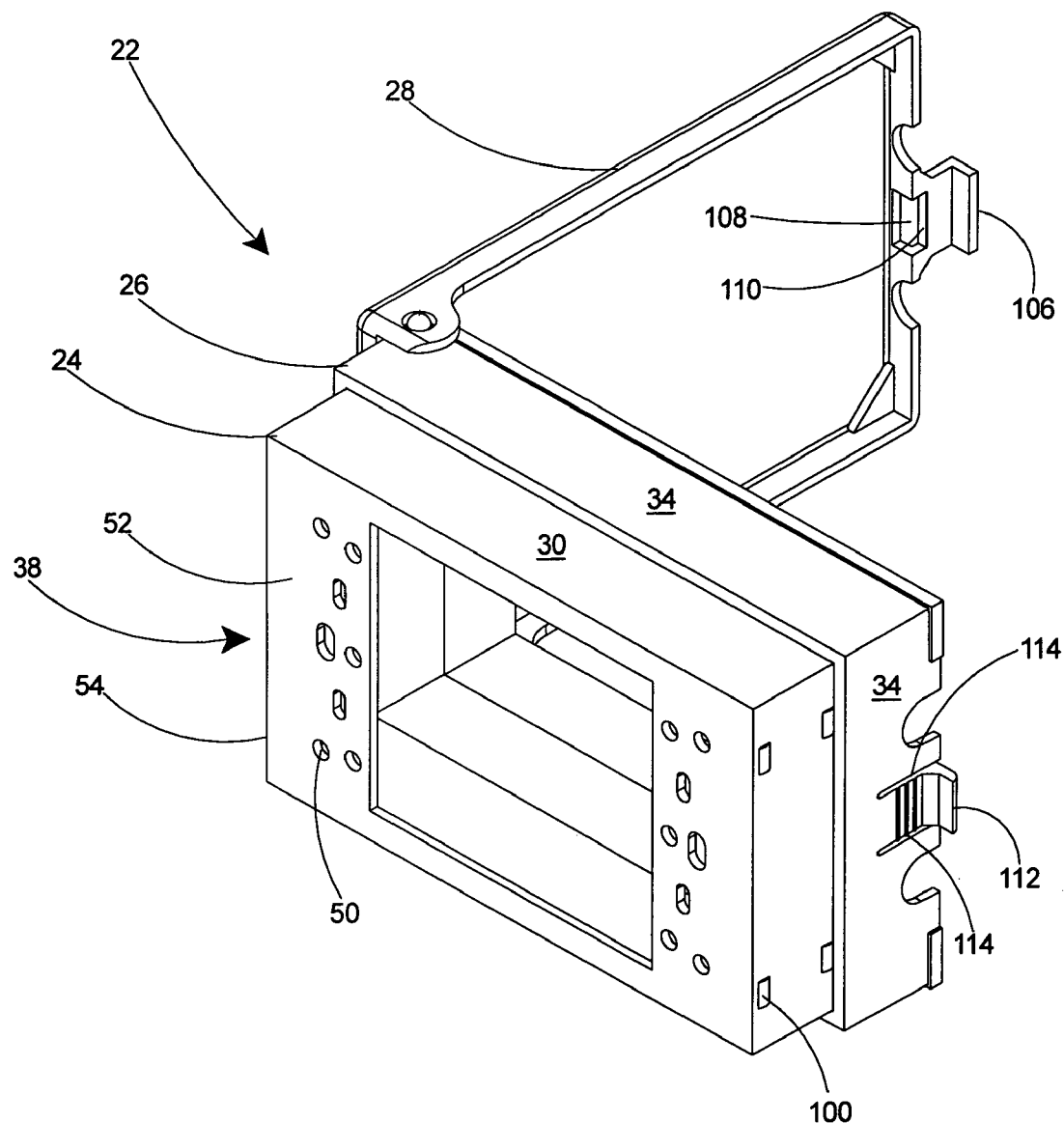
FIG. 12 is a perspective view of the telescoping box adapter of FIG. 1 in an expanded configuration.

With reference to FIG. 12, a first embodiment is shown of a telescoping box adapter according to the present invention. The first embodiment is a two-tier telescoping box adapter 22 that includes a first frame member 24, a second frame member 26 slideable with respect to the first frame member 24, and a cover member 28 secured to the second frame member 26.

Referring to FIG. 1, the first frame member 24 includes sidewalls 30 having an outer periphery 32. The second frame member 26 includes sidewalls 34 having an inner periphery 36. A fastening arrangement 38 is provided on the first frame member 24 for securing the first frame member 24 to an electrical box 40. As shown in FIG. 1, the two-tier telescoping box adapter 22 may be secured to an electrical box 40 that is mounted to a wall 42. The telescoping box adapter 22 is secured to the electrical box 40 by fasteners 44 threaded through the ears 46 of an electrical device 48 and then through apertures 50 in extensions 52 from the rear edge 54 of the first frame member 24. A face plate 56 is then secured to the electrical device 48 by a fastener 58. A gasket 60 may be included between the first frame member 24 and the electrical box 40. The cover member 28 may include ears 62 and apertures 64 therein for engaging posts 66 on the sidewalls 34 of the second frame member 26 and making the cover member 28 pivotable on the posts 66. The outer periphery 32 of the sidewalls 30 of the first frame member 24 is slightly smaller than the inner periphery 36 of the sidewalls 34 of the second frame member 26 thereby making the second frame member 26 slideable with respect to the first frame member 24.

Figure 2:
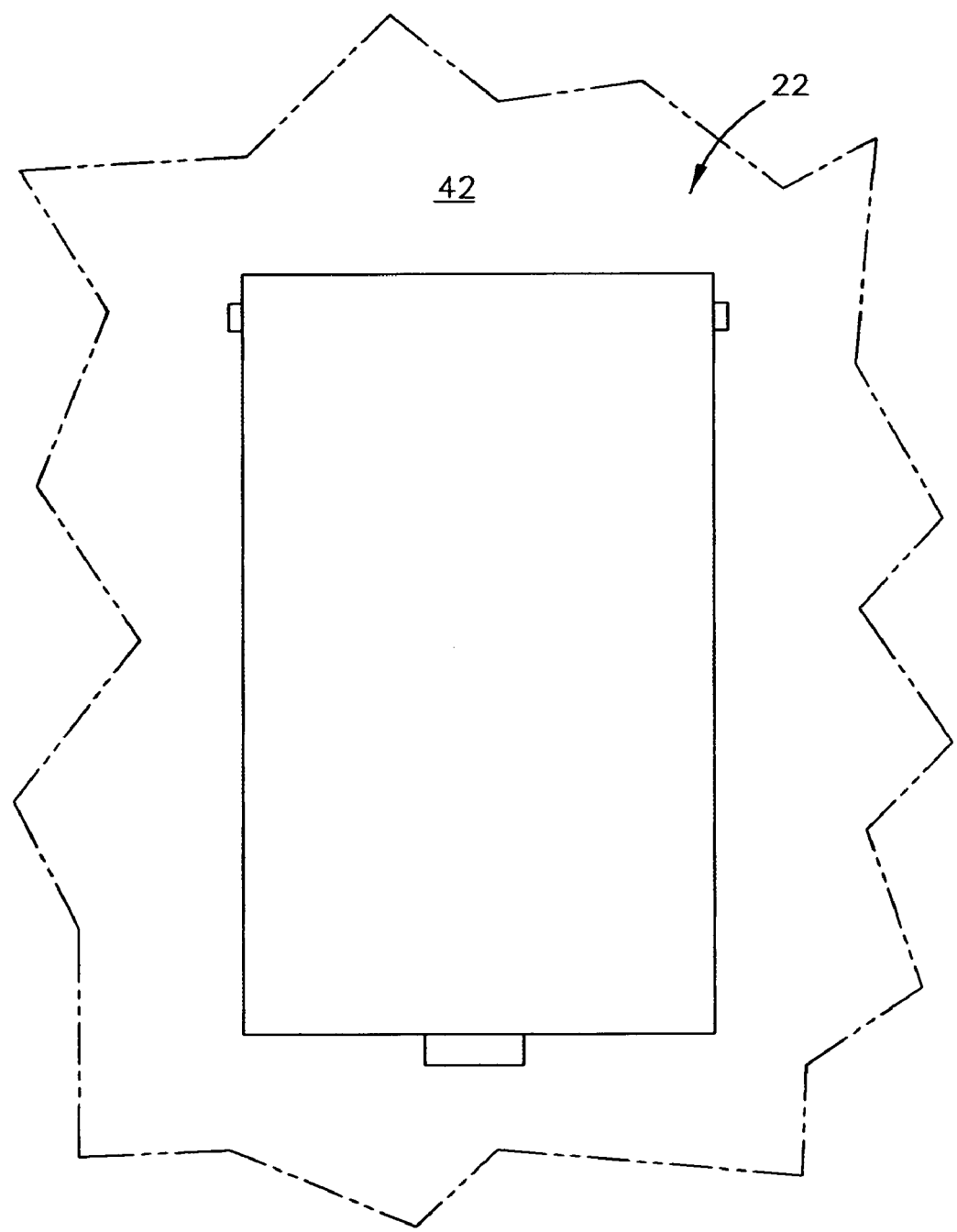
FIG. 2 is a front view of the telescoping box adapter of FIG. 1 installed on a wall.

As shown in FIG. 2 in the frontal view of the completed installation of the telescoping box adapter 22, the adapter 22 provides an electrical cover when mounted on the wall 42 of a building.

Figure 8:
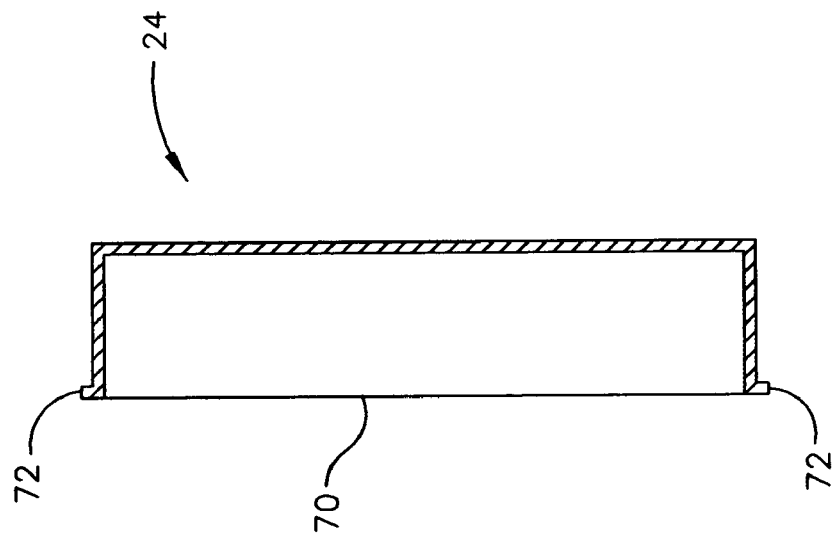
FIG. 8 is a sectional view of the first frame member taken along line 8—8 of FIG. 14.

As shown in FIG. 8, the first frame member 24 includes a front edge 70 and an outward extending lip 72 on the front edge 70.

The second frame member 26, as shown in FIG. 9, includes a rear edge 74 and an inward extending lip 76 on the rear edge 74. With reference to FIGS. 8 and 9, the second frame member 26, which is slideable with respect to the first frame member 24, is therefore limited in its extent of sliding outwardly with respect to the second frame member 26 by the outward extending lip 72 of the first frame member 24 engaging the inward extending lip 76 of the second frame member 26.

Figure 3:
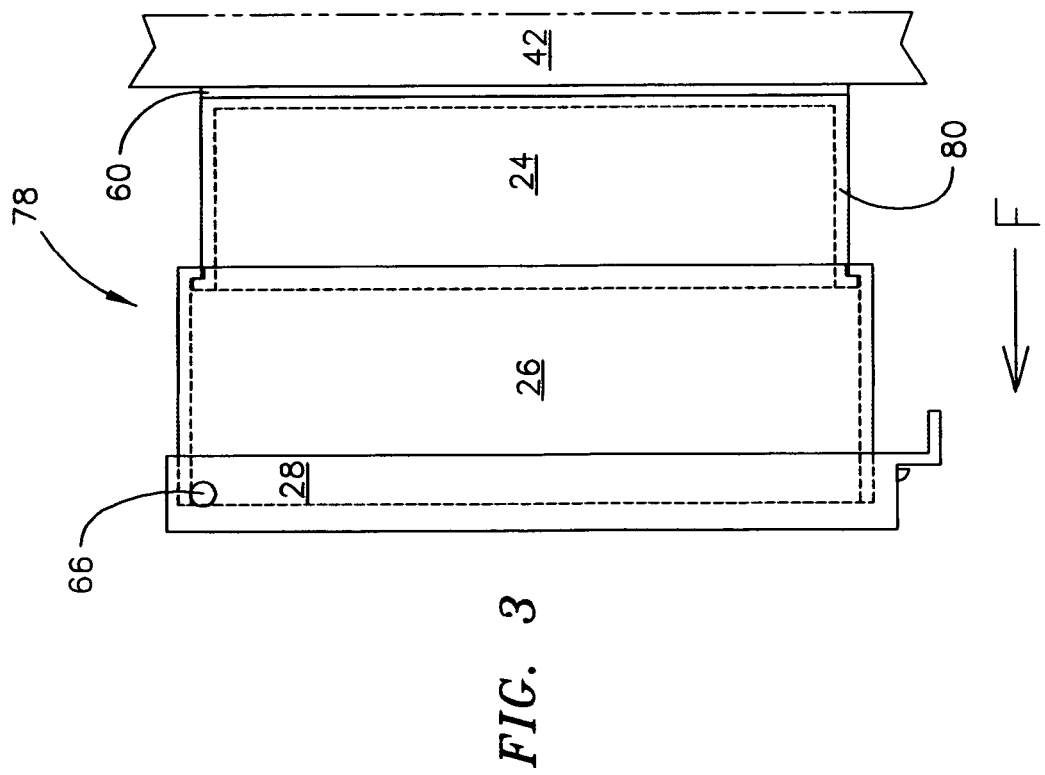
FIG. 3 is a side view of the telescoping box adapter of FIG. 1 in a fully expanded configuration.

With reference to FIG. 3, the second frame member 26 is slideable forward (F arrow) with respect to the first frame member 24 to a fully expanded configuration 78 forming an expanded enclosure 80 therein.

Figure 4:
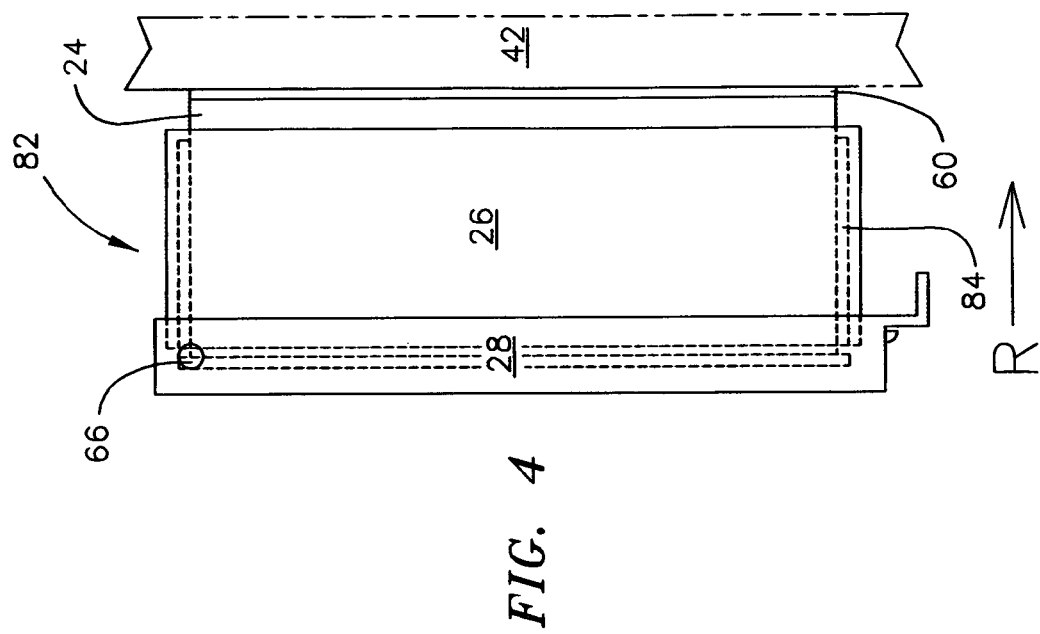
FIG. 4 is a side view of the telescoping box adapter of FIG. 1 in a fully collapsed configuration.

As shown in FIG. 4, the second frame member 26 is also slideable rearward (R arrow) with respect to the first frame member 24 to a fully compressed configuration 82 forming a compressed enclosure 84 therein.

With reference to FIG. 10, the cover member 28 includes a lower sidewall 86 having a lower edge 88 and U-shaped openings 90 extending from the lower edge 88 into the lower sidewall 86.

As shown in FIG. 11, the sidewalls 34 of the second frame member 26 include a lower sidewall 92 and a front edge 94. One or more U-shaped openings 96 extend inwardly from the front edge 94 of the lower sidewall 92 of the second frame member 26.

Figure 6:
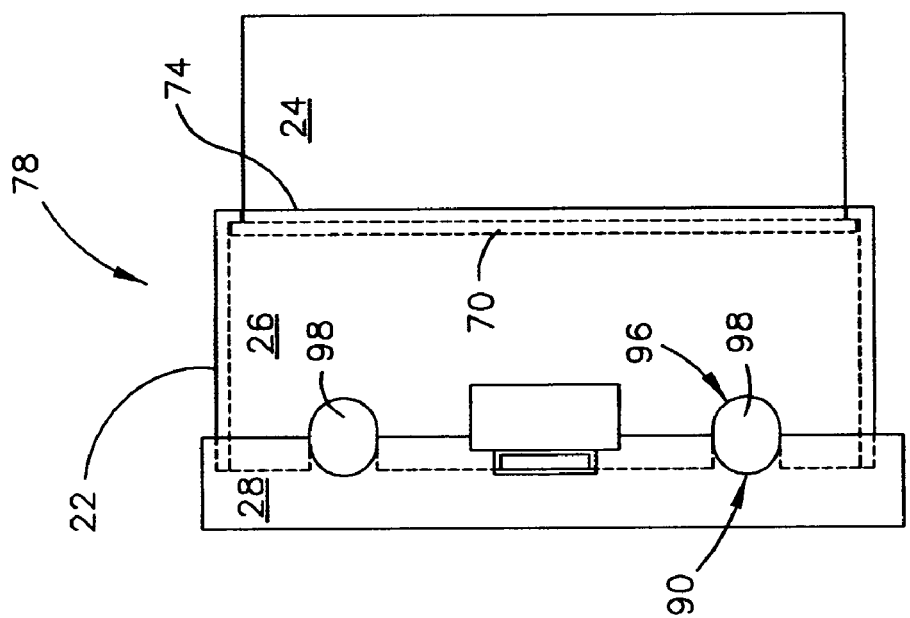
FIG. 6 is a bottom view of the fully expanded telescoping box adapter of FIG. 3.

Referring to FIG. 6, with the second frame member 26 in the fully expanded configuration 78, and the cover member 28 closed on the second frame member 26, a circular cord opening 98 is provided by the mating of the U-shaped openings 90 in the cover member 28 with the corresponding U-shaped openings 96 in the second frame member 26. In the fully expanded configuration 78 of FIG. 6, the front edge 70 (dotted line) of the first frame member 24 is positioned near the rear edge 74 of the second frame member 26 and substantially behind the circular cord openings 98.

Figure 5:
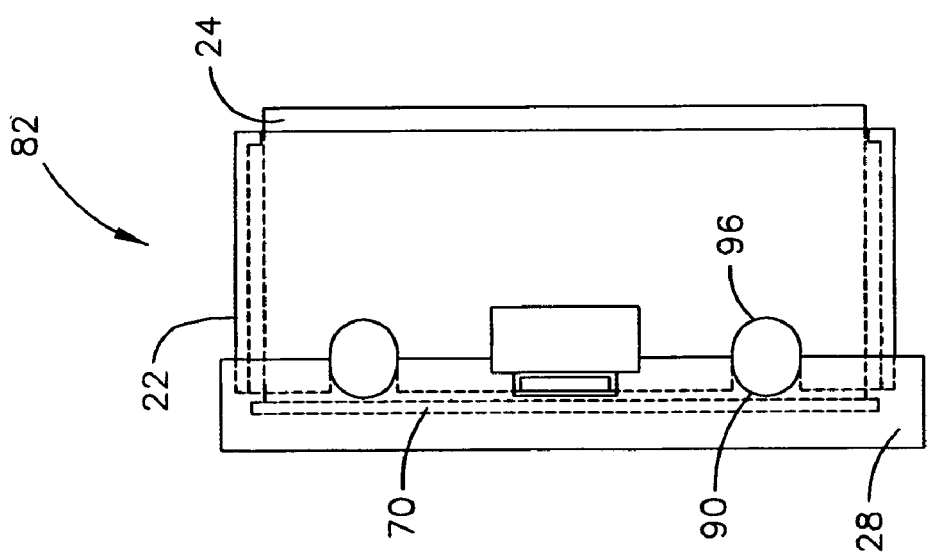
FIG. 5 is a bottom view of the fully collapsed telescoping box adapter of FIG. 4.

Referring to FIG. 5, with the second frame member 26 in the fully compressed configuration 82, and the cover member 28 closed on the second frame member 26, the U-shaped openings 90 in the cover member 28 and the corresponding U-shaped openings 96 in the second frame member 26 are closed off or blocked by the first frame member 24, the front edge 70 (dotted line) of which is positioned near the cover member 28. The telescoping box adapter 22 can therefore be fully collapsed to close off the U-shaped openings 90, 96 and seal the enclosure against the weather.

With reference to FIGS. 14–16A, one or more nubs 100 extend outwards from the outer periphery 32 of the sidewalls 30 of the first frame member 24.

Referring to FIG. 9, the inside dimension X within the sidewalls of the second frame member is 5.460 inches. As shown in FIG. 16, the outside dimension Y across the sidewalls of the first frame member is 5.322 inches. The outside dimension Z across the nubs 100 of the first frame member is 5.352 inches.

Figure 20A:
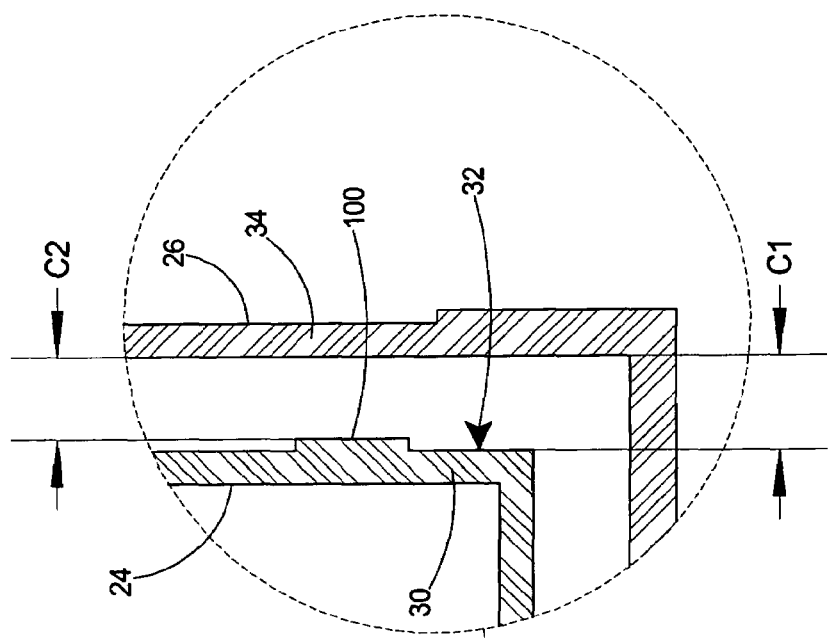
FIG. 20A is an exploded view of a corner of the two-tier telescoping box adapter of FIG. 20.
Figure 20:
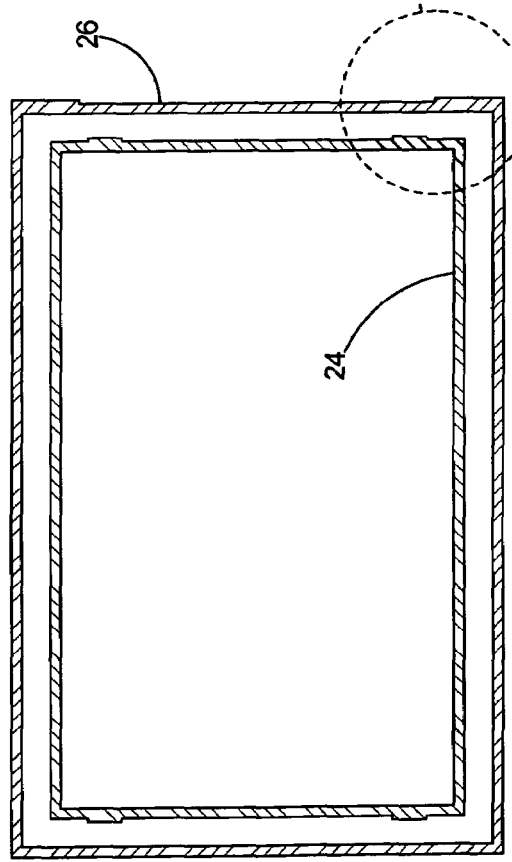
FIG. 20 is a sectional view taken along line 20—20 of the compressed two-tier telescoping box adapter in FIG. 19.
Figure 19:
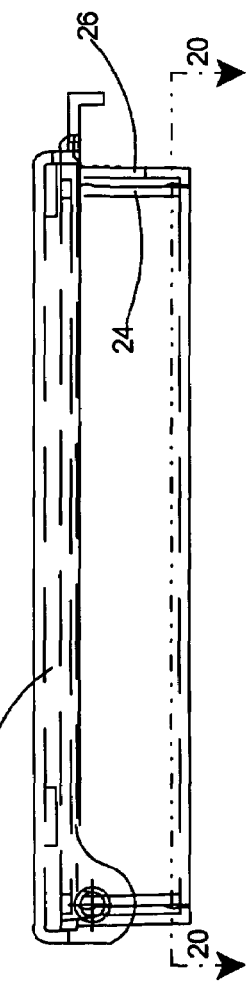
FIG. 19 is a side view of the two-tier telescoping box adapter of FIG. 12 in a compressed configuration.

With reference to FIGS. 20 and 20A, a critical dimension of the telescoping box adapter of the present invention is the clearance between the sidewalls of the adjacent or nested frame members. These distances are critical in that each inner frame member must slide within the outer frame member it is nested within. However, the clearance between the two pieces cannot be too great as, for example, if the adapter was in the expanded configuration, an excessively large clearance would enable a light force on the front of the adapter to cause it to close. The nubs 100 therefore are provided on the outer surface of the sidewalls of the inner frame member to reduce the clearance between the inner frame member and the outer frame member without appreciably adding to the friction caused by sliding the inner frame member with respect to the outer frame member. To achieve the correct sliding friction and also to provide enough friction to hold the box in the expanded configuration, the preferred or first clearance C1 (FIG. 20A) between the sidewalls of the second frame member 26 and the sidewalls of the first frame member 24 is 0.075 inch per side and the preferred or second clearance C2 (FIG. 20A) between the nubs 100 on the outer periphery 32 of the sidewalls 30 of the first frame member 24 and the sidewalls 34 of the second frame member 26 is 0.055 inch per side. The 0.055 inch clearance on each side of the first frame member 24 between the nubs 100 on the outer periphery 32 of the first frame member 24 and the sidewalls 34 of the second frame member 26 provides the proper friction between adjacent frame members and enables the telescoping box adapter to remain in the expanded configuration or in the compressed configuration until a desired minimum force is applied to change the configuration. To achieve the proper friction between the nested frame members, an acceptable range for the first clearance C1 on each side between the sidewalls 34 of the second frame member 26 and the sidewalls 30 of the first frame member 24 is between 0.035 and 0.115 inch and an acceptable range for the second clearance C2 between the nubs 100 on the outer periphery of the first frame member 24 and the sidewalls of the second frame member 26 is between 0.015 and 0.095 inch.

Referring to FIG. 12, the fastening arrangement 38 includes one or more extensions 52 extending from the rear edge 54 of the first frame member 24 and apertures 50 in the extensions 52. As shown in FIG. 1, the apertures 50 are capable of receiving fasteners 44 for securing the first frame member 24 to the electrical box 40.

Figure 7:
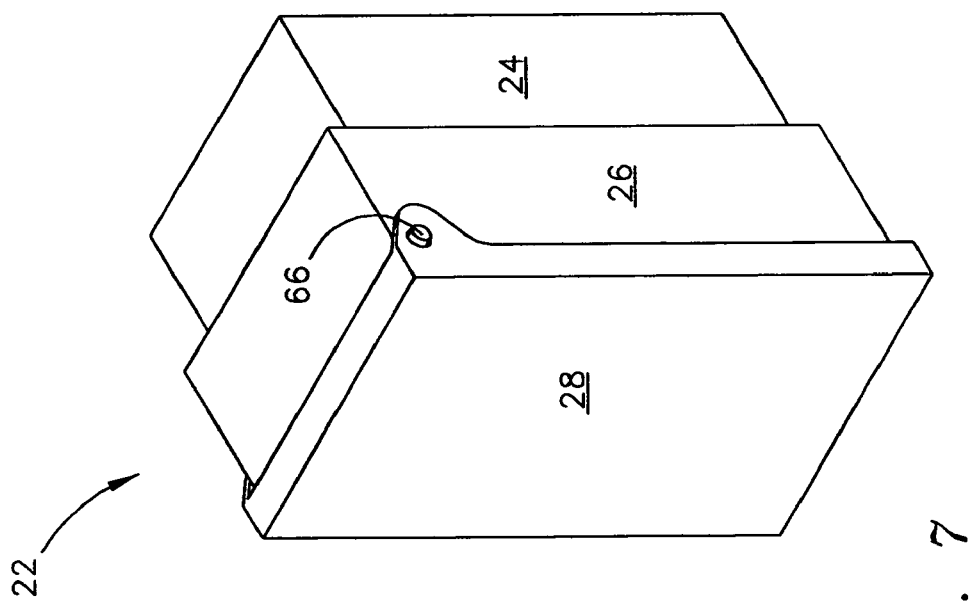
FIG. 7 is a perspective view of the two-tier telescoping box adapter in an expanded configuration.

With reference to FIG. 12, the cover member 28 is capable of being moved from an open position to a closed position (see FIG. 7). As shown in FIG. 12, the cover 28 includes a latch member 106 having an opening 108 and an engaging surface 110 therein. A bendable tab 112 is included on the second frame member 26. When the cover member 28 is closed upon the second frame member 26, the engaging surface 110 on the latch member 106 engages the bendable tab 112 and forces it upward on closing. The bendable tab 112, whose resiliency and flexibility is increased by the openings 114 in the sidewalls 34 of the second frame member 26, snaps downward into its unbiased position after clearing the engaging surface 110 on the latch member 106. This insures that the cover member 28 will not spring open on its own or by a slight impact, but requires a downward pull on the latch member 106 to open it.

Figure 13:
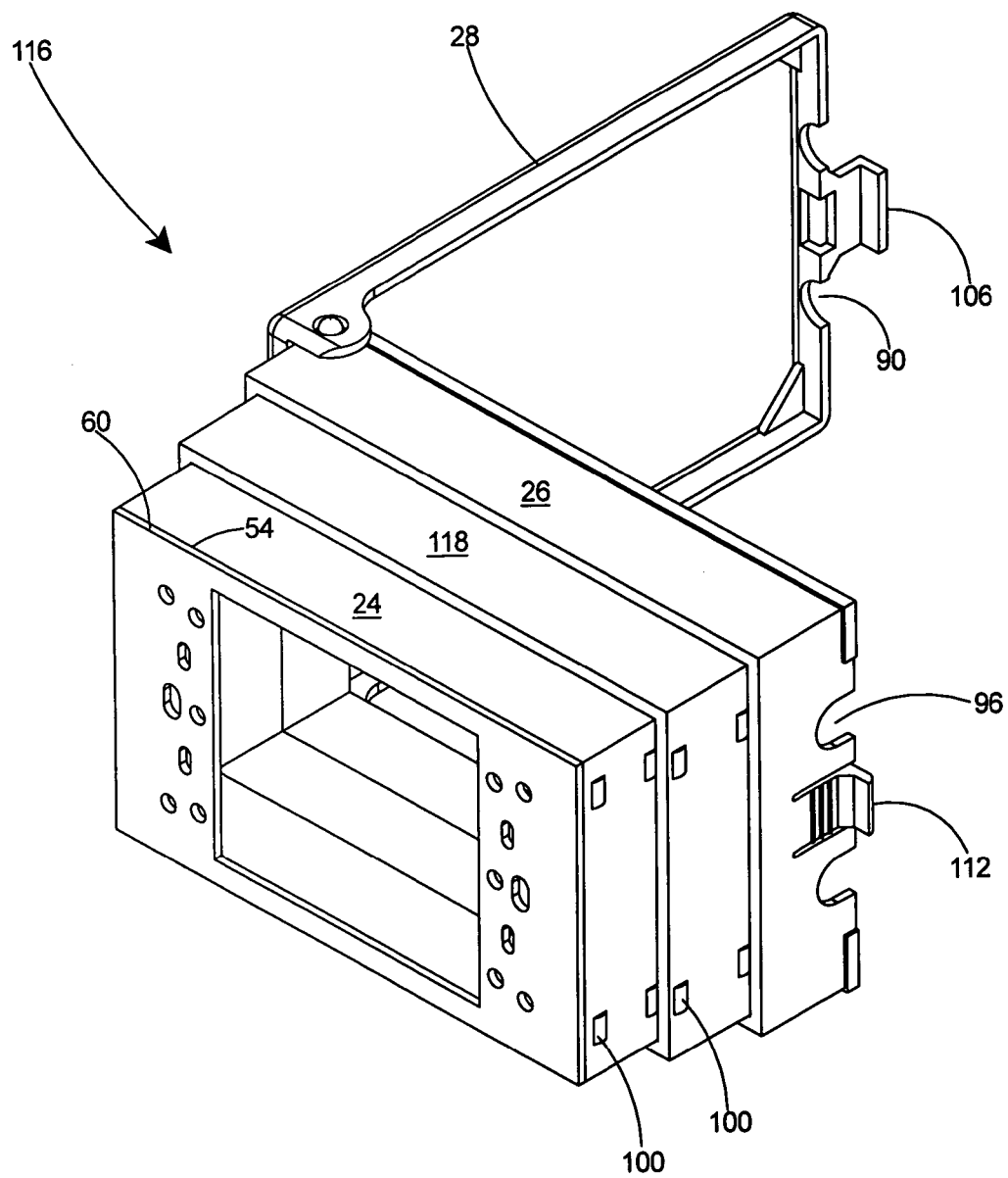
FIG. 13 is a perspective view of a second embodiment of the telescoping box adapter of the present invention in an expanded configuration.

FIG. 13 depicts a second embodiment of the telescoping box adapter. The telescoping box adapter 116 in FIG. 13 is a 3-tier telescoping box adapter and includes a first frame member 24 and second frame member 26 similar to the 2-tier adapter of the first embodiment. A middle frame member 118 is included between the first frame member 24 and second frame member 26. The first frame member 24 is slideable with respect to the middle frame member 118 and the middle frame member 118 is slideable with respect to the second frame member 26. It should be understood that additional frame members (not shown) could be added to the telescoping box adapter 116 to create additional tiers, such as to construct a 4-tier or 5-tier adapter (not shown).

Figure 18:
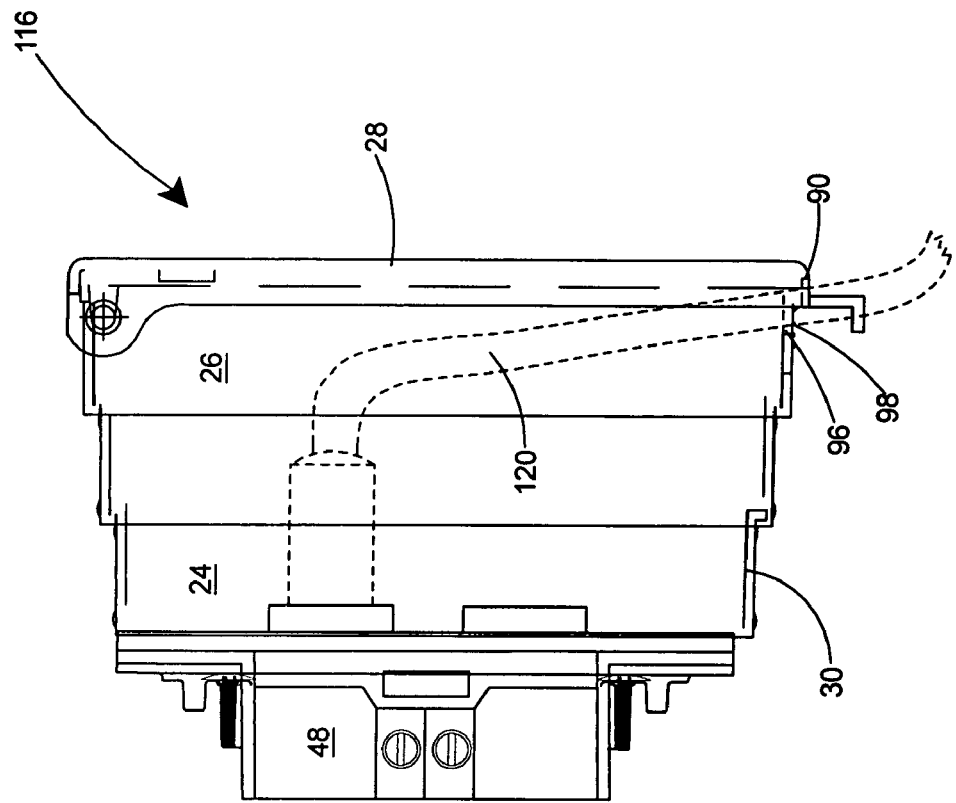
FIG. 18 is a side view of the three-tier telescoping box adapter of FIG. 13 in an expanded configuration with a duplex outlet and an electrical cord plugged therein.
Figure 17:
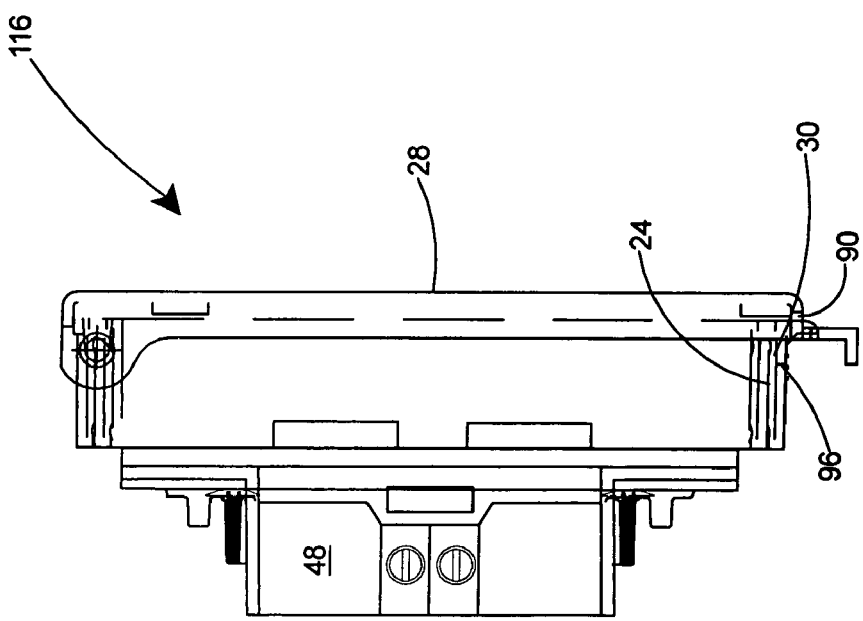
FIG. 17 is a side view of the three-tier telescoping box adapter of FIG. 13 in a compressed or collapsed configuration with a duplex outlet therein.

The 3-tier telescoping box adapter 116 is depicted in its compressed configuration in FIG. 17 and in its expanded configuration in FIG. 18. When the duplex outlet 48 is not in use and there are no electrical cords are plugged into the outlet 48, the telescoping box adapter 116 is operated in the compressed configuration, as shown in FIG. 17. In the compressed configuration there are no cord openings in the bottom of the adapter 116 as the sidewall 30 of the first frame member 24 is positioned over the U-shaped openings 90, 96 in the bottom of the cover member 28 and second frame member 26 respectively (see FIG. 5). When the duplex outlet 48 is in use, as shown in FIG. 18, and one or more electrical cords 120 are plugged into the outlet 48, the telescoping box adapter 116 is operated in the expanded configuration, as shown in FIG. 18. In the expanded configuration the second frame member 26 is pulled outward from the first frame member 24 thus positioning the first frame member 24 away from the U-shaped openings 90, 96 in the bottom of the cover member 28 and second frame member 26 respectively (see FIG. 6). Therefore, in the expanded configuration as shown in FIG. 6, the circular cord openings 98 in the bottom of the adapter are open. As shown in FIG. 18, in the expanded configuration an electrical cord 120 can be routed out each circular cord opening 98 in the bottom of the telescoping box adapter 116.

The telescoping box adapter of the present invention may be used to cover an electrical box with a weatherproof enclosure that is adaptable from a compressed configuration to an expanded configuration. The telescoping box adapter may be 2-tier, 3-tier, or have additional tiers as desired to provide the desired size enclosure for the electrical device. The telescoping box adapter is provided as an assembly, as shown in FIG. 13, including a first frame member 24, a second frame member 26, a cover member 28, and additional middle frame members 118 as required to achieve the desired number of tiers. The gasket 60 is typically provided adhered to the rear edge 54 of the first frame member 24 and therefore is part of the telescoping box adapter assembly.

With reference to FIG. 1, the telescoping box adapter 22 is operated by securing the first frame member 24 to an electrical box 40 by affixing the fasteners 44 through the ears 46 of the electrical device 48 and through the apertures 50 in the first frame member 24 and into the electrical box 40. A face plate 56 is then typically secured to the electrical device 48. The user may then operate the telescoping box adapter 22 in one of two modes. With reference to FIG. 17, the user may create a compressed enclosure by sliding the second frame member 26 fully upon the first frame member 24. This closes off the openings in the bottom of the telescoping box adapter 22 and creates a weatherproof enclosure around the unused duplex outlet 48. At any time the duplex outlet is put into use, with an electrical cord 120 plugged into the outlet 48, the user can create an expanded enclosure (see FIG. 18) by sliding the second frame member 26 fully away from the first frame member 24. In the expanded configuration, as shown in FIG. 18, the circular cord openings 98 are open and the electrical cords 120 can be routed therethrough to provide a weatherproof expanded enclosure.

Having thus described the invention with reference to a preferred embodiment, it is to be understood that the invention is not so limited by the description herein but is defined as follows by the appended claims.

What is claimed is:

1. A box adapter comprising:
   a first frame member including sidewalls having an outer periphery;
   a fastening arrangement on said first frame member for securing said first frame member to an electrical box;
   a second frame member including sidewalls having an inner periphery;
   said second frame member slideable with respect to said first frame member; and
   a cover member secured to said second frame member, said cover member capable of being moved from an open to a closed position.

2. The box adapter of claim 1 wherein said outer periphery of said sidewalls of said first frame member is slightly smaller than said inner periphery of said sidewalls of said second frame member.

3. The box adapter of claim 1 wherein
   said first frame member includes a front edge and an outward extending lip on said front edge;
   said second frame member includes a rear edge and an inward extending lip on said rear edge; and
   said second frame member slideable with respect to said first frame member is limited by said outward extending lip of said first frame member engaging said inward extending lip of said second frame member.

4. The box adapter of claim 3 wherein said rear edge of said second frame member includes a gasket thereon.

5. The box adapter of claim 1 including nubs on said outer periphery of said first frame member extending outwardly therefrom.

6. The box adapter of claim 5 including
   a first clearance per side between said sidewalls of said second frame member and said sidewalls of said first frame member is between 0.035 and 0.115 inch; and
   a second clearance per side between said nubs on said outer periphery of said first frame member and said sidewalls of said second frame member is between 0.015 and 0.095 inch.

7. The box adapter of claim 1 wherein said fastening arrangement includes
   a rear edge on said first frame member;
   one or more extensions extending from said rear edge of said first frame member; and
   apertures in said extensions;
   whereby said apertures are capable of receiving fasteners for securing said first frame member to said electrical box.

8. The box adapter of claim 1 wherein
   said sidewalls of said second frame member includes a lower sidewall;
   said lower sidewall of said second frame member includes a front edge; and
   one or more U-shaped openings extending inwardly from said front edge of said lower sidewall of said second frame member.

9. The box adapter of claim 8 wherein
   said second frame member is slideable forward with respect to said first frame member to a fully expanded configuration forming an expanded enclosure therein; and
   said second frame member is slideable rearward with respect to said first frame member to a fully compressed configuration forming a compressed enclosure therein.

10. The box adapter of claim 9 wherein said second frame member in said fully expanded configuration provides a cord opening therein through said U-shaped openings into said expanded enclosure.

11. The box adapter of claim 10 wherein said second frame member in said fully compressed configuration provides closure of said U-shaped openings by said sidewalls of said first frame member.

12. A method of covering an electrical box with a weatherproof enclosure adaptable from a compressed configuration to an expanded configuration, including:
   a) providing an adapter having a first frame member including sidewalls having an outer periphery, a fastening arrangement on said first frame member including apertures in said first frame member, fasteners, a second frame member including sidewalls having an inner periphery with said second frame member slideable with respect to said first frame member, and a cover member on said second frame member capable of being moved from an open to a closed position;
   b) securing said first frame member to said electrical box with said fasteners through said apertures in said first frame member and into said electrical box;
   c) creating a compressed enclosure by sliding said second frame member fully upon said first frame member; and d) creating an expanded enclosure by sliding said second frame member fully away from said first member.

13. A box adapter comprising:

a first frame member including sidewalls;

a fastening arrangement on said first frame member for securing said first frame member to an electrical box;

a middle frame member including sidewalls, said sidewalls of said first frame member disposed within said sidewalls of said middle frame member and slideable with respect thereto;

a second frame member including sidewalls, said sidewalls of said middle frame member disposed within said sidewalls of said second frame member and slideable with respect thereto; and a cover member secured to said second frame member, said cover member capable of being moved from an open to a closed position.

14. The box adapter of claim 13 wherein said first frame member includes a front edge and an outward extending lip on said front edge;

said middle frame member including a front edge having an outward extending lip thereon, said middle frame member including a rear edge having an inward extending lip thereon;

said second frame member including a rear edge having an inward extending lip thereon;

said middle frame member slideable with respect to said first frame member is limited by said outward extending lip of said first frame member engaging said inward extending lip of said middle frame member; and said second frame member slideable with respect to said middle frame member is limited by said outward extending lip of said middle frame member engaging said inward extending lip of said second frame member.

15. The box adapter of claim 13 wherein said fastening arrangement includes a rear edge on said first frame member;

one or more extensions extending from said rear edge of said first frame member; and apertures in said extensions;

whereby said apertures are capable of receiving fasteners for securing said first frame member to said electrical box.

* * * * *